United States Patent
Li et al.

(10) Patent No.: US 11,576,420 B2
(45) Date of Patent: Feb. 14, 2023

(54) INTELLIGENT CONTROL SYSTEM AND METHOD OF THIN PLATE DRIER FOR CUT TOBACCO

(71) Applicant: Zhangjiakou Cigarette Factory Co., Ltd, Hebei (CN)

(72) Inventors: Zijuan Li, Hebei (CN); Bo Liu, Hebei (CN); Yang Gao, Hebei (CN); Wangchang Miao, Hebei (CN); Ting Fang, Hebei (CN); Weidong Yao, Hebei (CN); Dongsheng Du, Hebei (CN); Liyuan Zhao, Hebei (CN); Jiaojiao Chen, Hebei (CN); Xiaohui Jia, Hebei (CN); Zheng Zhou, Hebei (CN); Yanshu Ma, Hebei (CN); Wenhui Chang, Hebei (CN); Wei Wei, Hebei (CN); Minglei Ma, Hebei (CN); Zixian Feng, Hebei (CN)

(73) Assignee: Zhangjiakou Cigarette Factory Co., Ltd, Zhangjiakou (CN)

( * ) Notice: Subject to any disclaimer, the term of this patent is extended or adjusted under 35 U.S.C. 154(b) by 0 days.

(21) Appl. No.: 17/468,663

(22) Filed: Sep. 7, 2021

(65) Prior Publication Data
US 2022/0142225 A1    May 12, 2022

(30) Foreign Application Priority Data

Jul. 10, 2020    (CN) .......................... 202010663211.9

(51) Int. Cl.
*A24B 3/04*    (2006.01)
*G05B 13/02*    (2006.01)
(Continued)

(52) U.S. Cl.
CPC .............. *A24B 3/04* (2013.01); *G05B 13/027* (2013.01); *G05B 13/042* (2013.01); *G06F 11/362* (2013.01)

(58) Field of Classification Search
None
See application file for complete search history.

(56) References Cited

FOREIGN PATENT DOCUMENTS

| CN | 102871214 A | 1/2013 |
|---|---|---|
| CN | 203446505 U | 2/2014 |

(Continued)

OTHER PUBLICATIONS

Shaohua Yang et al., Control of Tobacco Moisture Content in Thin Plate Cylinder Dryer Based on Exhausted Air Volume, Tobacco Science & Technology, Mar. 2015, pp. 89-94, vol. 48 (3).

(Continued)

*Primary Examiner* — Phu H Nguyen

(57) ABSTRACT

An intelligent control system and method of thin plate dryer for cut tobacco are provided. The system includes a factor searching and screening unit, a control unit, an early warning unit. The control unit adopts a dual-model control method and establishes a process parameter control model and an energy balance model, the control unit calculates the moisture discharge opening value in real time according to the dual-model; the early warning unit is configured to connected with the control unit, and send out an alarm information based on early warning signal. The present disclosure is designed to transform the traditional control into intelligent precision control, improve product quality, reduce product differences between batches and build an intelligent early warning function.

9 Claims, 1 Drawing Sheet

(51) Int. Cl.
G05B 13/04 (2006.01)
G06F 11/36 (2006.01)

(56) References Cited

FOREIGN PATENT DOCUMENTS

| | | |
|---|---|---|
| CN | 103704875 A | 4/2014 |
| CN | 105361230 A | 3/2016 |
| CN | 106343601 A | 1/2017 |
| CN | 106983172 A | 7/2017 |
| CN | 108294352 A | 7/2018 |
| CN | 109090679 A | 12/2018 |
| CN | 109259291 A | 1/2019 |
| CN | 109640708 A | 4/2019 |
| CN | 111103854 A | 5/2020 |
| CN | 111109643 A | 5/2020 |
| DE | 3323000 A1 | 1/1984 |
| GB | 2207336 A | 2/1989 |

OTHER PUBLICATIONS

Bingjun Liu et al., Study on Correlation of Process Parameters of Sheet Dryer, Popular Science & Technology, Oct. 2012, pp. 93-95, vol. 14 (10).

First Office Action of Counterpart Chinese Patent Application No. 202010663211.9 dated May 6, 2021.

Notification to Grant Patent Right of counterpart Chinese Patent Application No. 202010663211.9 dated Jul. 6, 2021.

INTELLIGENT CONTROL SYSTEM AND METHOD OF THIN PLATE DRIER FOR CUT TOBACCO

CROSS REFERENCE TO RELATED APPLICATIONS

The present application claims the benefit of Chinese Patent Application No. 202010663211.9 filed on Jul. 10, 2020, the contents of which are incorporated herein by reference in their entirety.

TECHNICAL FIELD

The invention relates to the tobacco industry, specifically to the field of cut tobacco production control, and in particular to an intelligent control system and method of thin plate drier for cut tobacco.

BACKGROUND

In the process of tobacco production, the process of making cut tobacco is a very important link, in which the tobacco is made into qualified cut tobacco step by step through a variety of processing procedures in accordance with certain procedures, according to the physical and chemical characteristics of tobacco raw materials. Therefor in the process of tobacco production, making cut tobacco has the longest and the most complicated process, with most kinds of equipment.

The thin plate drier (a cut tobacco dryer of thin plate type) is an important equipment for cut tobacco production, which has the characteristics of low processing strength, high original flavor retention rate and the like. But in prior art, the production and operation control method of the equipment is semi-automatic production mode, that is: when the feeding material moisture is stable, the equipment is automatically controlled by PID control system; when the feeding material moisture fluctuates greatly, manual intervention is needed to adjust the parameters since automatic adjustment is usually represent delay.

At present, the early warning system of a thin plate drier is relatively simple. Early warning is given based on the moisture information feedback from the moisture meter at the outlet of the thin plate drier. The moisture exceeds the upper and lower limits of the process is regarded as an early warning information, the early warning information is limited by the accuracy of the moisture meter and the working principle of the moisture meter.

An invention patent application with publication number CN111109643A discloses a control method and system for cut tobacco moisture content of thin plate cut tobacco drier. The method includes: setting hot air temperature of the sheet cut tobacco drier according to a set value, and setting a target value of outlet moisture content of the sheet cut tobacco drier; obtaining an actual measurement value of the outlet moisture content of the sheet cut tobacco drier, and obtaining a target deviation value of the outlet moisture content according to the target value and the actual measurement value; establishing a PID feedback control model to adjust the hot air speed according to the target deviation value so as to carry out feedback control over the outlet moisture content, which enables the outlet moisture content of the sheet cut tobacco drier within a batch to be controlled according to the target value.

An invention patent application with publication number CN111103854A discloses a system and method for improving the production stability of cut tobacco drier, belonging to the technical field of cut tobacco production. The system includes a data acquisition module, a data processing module, a stability evaluation module, an early warning and optimization module, a steady-state real-time analysis and evaluation module, an unsteady-state automatic control judgment module, an unsteady-state real-time analysis and evaluation module and the like. The invention is supported by new-generation information technologies such as industrial big data and artificial intelligence to shorten the unsteady-state time and improve the steady-state control quality, so as to effectively improve the quality stability of the whole production process of the cut tobacco drier.

SUMMARY

The present disclosure provides an intelligent control system and method of thin plate dryer for cut tobacco, can realize accurate control and early-warning, so as to realize the intelligence and automation of cut-tobacco production.

The present disclosure is designed to transform the existing control into an intelligent precision control, improve product quality, narrow product differences between batches and construct an intelligent early warning function.

The technical solutions adopted by the present disclosure includes:

an intelligent control system of a thin plate drier for cut tobacco, comprising:

a factor searching and screening unit, configured to search and screen the influence factors of the thin plate drier according to the process parameters, the production parameters and the environment parameters;

a control unit, configured to adopt a dual-model control method and comprise a process parameter control model and an energy balance model, wherein the process parameter control model adopts a neural network algorithm, and is established by using production parameters and process parameters as modeling factors, moisture discharge opening of thin plate drier for cut-tobacco as an output value, and other factors as input factors; the energy balance model adopts the principle of heat conservation, and is established by calculating the heat input and the heat output in the production process and constructing an identical equation;

the control unit calculates the moisture discharge opening value in real time according to the dual-model, and controls the production parameters of the system based on an average value of the two values calculated by the dual-model if a deviation of the moisture discharge opening value is less than or equal to 2%; and generates an early warning signal if the deviation of the moisture discharge opening value is more than 2%;

an early warning unit, configured to connected with the control unit and send out an alarm information based on the early warning signal.

In further embodiments, the control unit also establishes a material conservation model, which is established by constructing an identical equation of material input and output, the identical equation of material input and output is as follows:

material input+process material input=material output+process material loss;

wherein, the process material input includes HT steam; the process material loss includes moisture dissipation under humidity difference, moisture dissipation under high temperature baking.

In further embodiments, the control unit monitors the materials according to the material conservation model:

when a deviation of the actual discharging value and the theoretical calculated value is more than 5%, an early warning signal is generated.

In further embodiments, the early warning signal is associated with a production controller, and the production can be directly stopped through the production controller to wait for maintenance.

In further embodiments, the intelligent control system also includes a debugging unit, which is connected to the current production and operation system WinCC (Windows Control Center) for system debugging.

In further embodiments, the production parameters include outlet moisture of the thin plate drier for cut tobacco, inlet moisture of the cut tobacco drier and drum temperature of the cut tobacco drier; the process parameters include steam membrane valve opening of the cut tobacco drier, hot air temperature of the cut tobacco drier, moisture discharge opening of the cut tobacco drier, underground fan frequency of the cut tobacco drier, HT steam and plate platform temperature.

In further embodiments, the environment parameters include ambient humidity.

In further embodiments, the energy balance model adopts the principle of heat conservation, and is established by calculating the heat input and the heat output in the production process and constructing a heat identical equation, wherein the heat identical equation is as follows:

material temperature at feeding end+process heat input=material temperature at discharging end+ process heat output;

wherein, the process heat input includes: heat input of the HT steam and heat input of the thin plate cut tobacco drier platform; the process heat output includes environmental heat loss.

The present disclosure also provides an intelligent control method of a thin plate drier for cut tobacco, the method is applied to the intelligent control system of thin plate cut tobacco drier described above, including the following steps:

step 1, searching factors;

step 2, screening factors;

step 3, establishing a process parameter control model:

the process parameter control model adopts a neural network algorithm, and is established by using production parameters and process parameters as modeling factors, moisture discharge opening of the thin plate drier as an output value, and other factors as input factors;

step 4, establishing an energy balance model:

the energy balance model adopts the principle of heat conservation, and is established by calculating the heat input and the heat output in the production process and constructing an identical equation;

step 5, calculating the moisture discharge opening value in real time according to the models (dual-model) in the step 3 and step 4, when the deviation of the moisture discharge opening value calculated by the dual-model is less than or equal to 2%, the average value of the two values is used to control the production parameters of the system; when the deviation of the moisture discharge opening value calculated by the dual-model is more than 2%, an early warning signal is generated, and an alarm information is sent out by the early warning unit;

step 6, establishing a material conservation model:

the material conservation model is established by constructing an identical equation of material input and output;

step 7, according to the model of the step 6, generating an early warning signal when a deviation of an actual output value and a theoretical calculated value is more than 5%, and sending out an alarm information by the early warning unit, stopping the production, and waiting for maintenance.

The beneficial effects brought by the present disclosure are:

the present disclosure adopts the dual-model control principle, through the process parameter control model and the energy balance model, intelligent control and intelligent early warning of the system process parameters are carried out with the help of their predicted value from the models: when the deviation of the moisture discharge opening value calculated by the dual-model is less than or equal to 2%, the average value of the two values is used to control the production parameters; when the deviation of the moisture discharge opening value calculated by the dual-model is more than 2%, an early warning signal is generated, so as to find problems in advance and make pre-treatment. In other words, it can prevent problems from happening, therefor the product quality and production efficiency of cut tobacco production can be increased.

The present disclosure also establishes a material conservation model based on the above two models, which has the function of material monitoring and early warning: when the deviation of the actual value and the theoretical value for material output is more than 5%, the system will automatically generate an early warning. The early warning unit is configured to be associated with the production controller, the production can be directly stopped to wait for maintenance.

This system transforms a tradition control into an intelligent precision control, narrows product differences between batches, and builds an intelligent early warning function for process parameters and material monitoring, which truly realizes the intelligence and automation of production.

BRIEF DESCRIPTION OF FIGURES

The present disclosure will be further described with reference to the accompanying drawings and specific embodiments.

DETAILED DESCRIPTION

The technical solutions in the embodiments of the present disclosure will be described clearly and completely below in connection with the drawings in the embodiments of the present disclosure, and it is apparent that the embodiments described here are merely a part, not all of the embodiments of the present disclosure. All other embodiments obtained by those skilled in the art based on the embodiments of the present disclosure without creative efforts shall fall within the protection scope of the present disclosure.

In the present disclosure, unless explicitly stated and defined otherwise, the terms "arranged", "installed", "connected with", "connected", "fixed" and the like shall be understood broadly; for example, it may be either "fixedly connected" or "removably connected"; it may be "mechanically connected"; it may be "directly connected" or "indirectly connected through an intermediate medium". For those skilled in the art, the specific meanings of the above term in the present disclosure could be understood according to the specific conditions.

Embodiment 1

Figure 1:
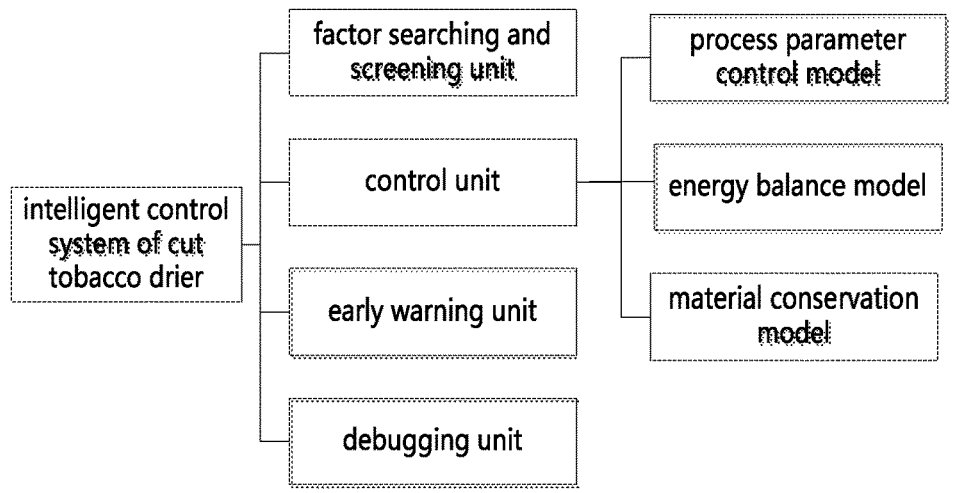
FIG. 1 illustrates a module diagram of the system of the present disclosure.

Referring to FIG. 1, this embodiment discloses an intelligent control system of a thin plate drier for cut-tobacco (also shown as cut-tobacco drier or thin plate drier for short), including:

a factor searching and screening unit, configured to search and screen the influence factors of the thin plate drier according to the process parameters, the production parameters and the environment parameters;

a control unit, adopting a dual-model control method, and establishing a process parameter control model and an energy balance model (the dual-model is actually the process parameter control model and the energy balance model), wherein the process parameter control model adopts a neural network algorithm, and is established by using production parameters and process parameters as modeling factors, moisture discharge opening of thin plate drier as an output value, and other factors as input factors; the energy balance model adopts the principle of heat conservation, and is established by calculating the heat input and the heat output in the production process and constructing an identical equation;

the control unit calculates the moisture discharge opening value in real time according to the dual-model, and when a deviation of the moisture discharge opening value calculated by the dual-model is less than or equal to 2% (this early warning threshold is adjustable), the average value of the two values (one is a displayed value shown in the opening table, the other is a theoretical value calculated by the dual model) is used to control the production parameters of the system; when the deviation of the moisture discharge opening value calculated by the dual-model is more than 2%, an early warning signal is generated;

an early warning unit, connected with the control unit, is configured to send out an alarm information based on the early warning signal.

Specifically, the results of searching and screening the influence factors of the thin plate drier are as follows:

production parameters, including outlet moisture of cut tobacco drier, inlet moisture of cut tobacco drier and drum temperature of cut tobacco drier;

process parameters, including steam membrane valve opening of cut tobacco drier, hot air temperature of cut tobacco drier, moisture discharge opening of cut tobacco drier, underground fan frequency of cut tobacco drier, HT steam and plate platform temperature;

environment parameters, including ambient humidity.

Figure 2:
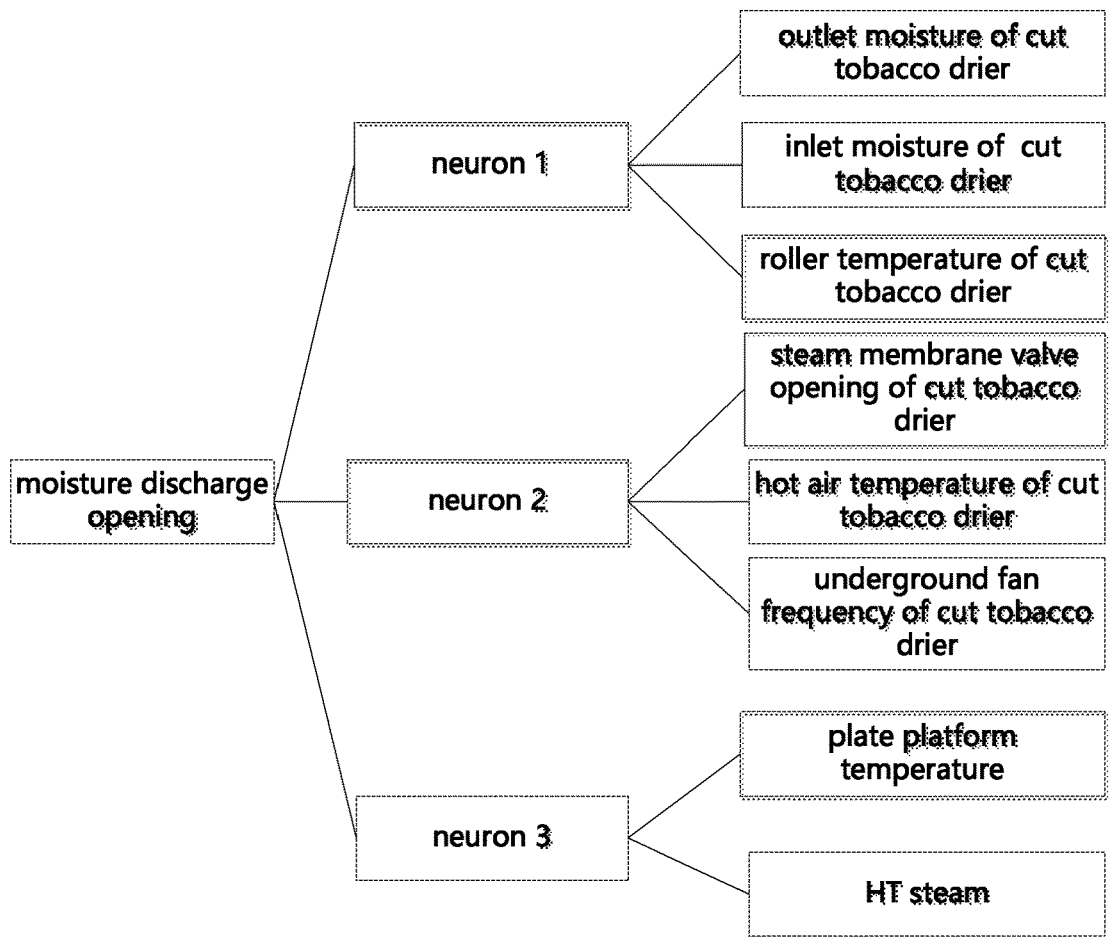
FIG. 2 shows a schematic diagram of the process parameters control model of the present disclosure.

Based on the above screening results, the process parameter control model is constructed by adopting the artificial neural network technique, taking production parameters and process parameters as modeling factors. Referring to FIG. 2, the process parameter control model is an artificial neural network model, established by using the moisture discharge opening of thin plate drier as an output value, other production parameters and process parameters except the moisture discharge opening as input factors, and setting up three neurons.

The energy balance model is established by adopting the principle of heat conservation, and calculating the heat input and the heat output in the production process and constructing a heat identical equation, wherein the heat identical equation is as follows:

material temperature at feeding end+process heat input=material temperature at discharging end+process heat output.

Wherein, the process heat input includes: heat input of the HT steam and heat input of the plate platform; the process heat output includes environmental heat loss.

Based on the above two models, the control unit also establishes a material conservation model, which is established by constructing an identical equation of material input and output, the identical equation of material input and output is as follows:

material input+process material input=material output+process material loss.

Wherein, the process material input includes HT steam; the process material loss includes moisture dissipation under humidity difference, moisture dissipation under high temperature baking.

The control unit monitors the materials according to the material conservation model:

when a deviation of the actual discharging value and the theoretical calculated value is more than 5%, an early warning signal is generated and an alarm information is sent out.

Each early warning signal can be associated with a production controller as needed, and the production can be directly stopped according to the production controller to wait for maintenance.

The intelligent control system also includes a debugging unit, which is connected to the current production and operation system WinCC for system debugging.

The intelligent control system of thin plate type cut tobacco drier of this embodiment adopts the dual-model control principle. Through the process parameter control model and the energy balance model, intelligent control and intelligent early warning for the system process parameters are carried out with the help of their predicted value: when the deviation of the moisture discharge opening value calculated by the dual-model is less than or equal to 2%, the average value of the two values is used to control the production parameters; when the deviation of the moisture discharge opening value calculated by the dual-model is more than 2%, an early warning signal is generated, so as to find problems in advance and make pre-treatment. In other words, it can prevent problems from happening, therefor the product quality and production efficiency of cut tobacco production can be increased.

At the same time, the material conservation model may have the function of material monitoring and early warning: when the deviation of the actual discharging value and the theoretical calculated value is more than 5%, the system will automatically provide an early warning. As the early warning unit is associated with the production controller, the production can be directly stopped to wait for maintenance.

This system transforms the existing control into an intelligent precision control, reduces product differences between batches, and builds an intelligent early warning function for process parameters and material monitoring, which realizes the intelligence and automation of production process.

Embodiment 2

An intelligent control method of cut tobacco drier, which is applied to the intelligent control system of cut tobacco drier described in the Embodiment 1, includes the following steps:

Step 1 Searching Factors

Influence factors of the thin plate drier in the cut tobacco production mainly includes: outlet moisture of sheet cut tobacco drier, inlet moisture of the cut tobacco drier, drum temperature of the cut tobacco drier, steam membrane valve opening of the cut tobacco drier, hot air temperature of the cut tobacco drier, moisture discharge opening of the cut tobacco drier, underground fan frequency of the cut tobacco drier, HT steam, plate platform temperature, sheet moisture discharge opening and ambient humidity.

Step 2 Screening Factors

The above influence factors are screened and grouped:

production parameters, including outlet moisture of cut tobacco drier, inlet moisture of the cut tobacco drier, drum temperature of cut tobacco drier;

process parameters, including steam membrane valve opening of cut tobacco drier, hot air temperature of cut tobacco drier, moisture discharge opening of cut tobacco drier, underground fan frequency of cut tobacco drier, HT steam and plate platform temperature;

environment parameters, including ambient humidity.

Step 3 Establishing a Process Parameter Control Model

The process parameter control model is established by adopting a neural network algorithm, and using production parameters and process parameters as modeling factors, wherein moisture discharge opening of thin plate drier as an output value, and other factors as input factors.

Step 4 Establishing an Energy Balance Model

The energy balance model is established by adopting the principle of heat conservation, and calculating the heat input and the heat output in the production process and constructing a heat identical equation.

The heat identical equation is as follows:

material temperature at the feeding end+process heat input=material temperature at the discharging end+process heat output;

wherein, the process heat input includes heat input of the HT steam, heat input of the sheet cut tobacco drier platform; the process heat output includes environmental heat dissipation.

Step 5 Calculating the Moisture Discharge Opening Value in Real Time According to the Two Models (Dual-Model) in the Step 3 and Step 4

When the deviation of the moisture discharge opening value calculated by the dual-model is less than or equal to 2%, the average value of the two values is used to control the production parameters of the system; when the deviation of the moisture discharge opening value calculated by the dual-model is more than 2%, an early warning signal is generated, and an alarm information is sent out by the early warning unit.

Step 6 Establishing a Material Conservation Model

The material conservation model is established by constructing an identical equation of material input and output.

The identical equation of material input and output is as follows:

material input+process material input=material output+process material loss;

wherein, the process material input includes HT steam; the process material loss includes moisture dissipation under humidity difference, moisture dissipation under high temperature baking.

Step 7 Generating Early Warning According to the Model of the Step 6

When the deviation of the actual discharging value and the theoretical calculated value is more than 5%, an early warning signal is generated and an alarm information is sent out by the early warning unit, and the production can be directly stopped to wait for maintenance.

Example 1

Trial run of the intelligent control system of cut tobacco drier in the Embodiment 1.

Assessment and statistics were performed on the process indexes of cut tobacco, and the results are shown in Table 1.

TABLE 1

| | acceptability of outlet moisture of cut tobacco drier | CPK of outlet moisture of cut tobacco drier | standard deviation of outlet moisture of cut tobacco drier | | acceptability of outlet moisture of cut tobacco drier | CPK of outlet moisture of cut tobacco drier | standard deviation of outlet moisture of cut tobacco drier |
| --- | --- | --- | --- | --- | --- | --- | --- |
| Batch 1 | 100% | 2.6 | 0.02 | Batch 6 | 100% | 2.2 | 0.02 |
| Batch 1 | 100% | 3.4 | 0.03 | Batch 7 | 100% | 2.3 | 0.05 |
| Batch 3 | 100% | 2.8 | 0.03 | Batch 8 | 100% | 2.3 | 0.03 |
| Batch 4 | 100% | 1.8 | 0.03 | Batch 9 | 100% | 2.8 | 0.04 |
| Batch 5 | 100% | 1.9 | 0.04 | Batch 10 | 100% | 3.1 | 0.03 |

It can be seen from the above table that the intelligent control system is effective and all its process indexes are qualified.

Example 2

Trial run of the intelligent control system of sheet cut tobacco drier in the Embodiment 1.

Statistics was performed on the alarm accuracy of the intelligent control system, and the results are shown in Table 2.

TABLE 2

|  | moisture discharge opening calculated by process parameters | moisture discharge opening calculated by energy conservation | whether early warning |  | moisture discharge opening calculated by process parameters | moisture discharge opening calculated by energy conservation | whether early warning |
|---|---|---|---|---|---|---|---|
| Batch 1 | 65 | 64 | no | Batch 6 | 57 | 57 | no |
| Batch 1 | 67 | 67 | no | Batch 7 | 47 | 47 | no |
| Batch 3 | 67 | 59 | yes | Batch 8 | 64 | 65 | no |
| Batch 4 | 49 | 49 | no | Batch 9 | 61 | 60 | no |
| Batch 5 | 52 | 53 | no | Batch 10 | 57 | 56 | no |

It can be seen from the above table that the early warning function of the intelligent control system is effective, and when the deviation is more than 2%, the early warning unit works.

Example 3

Trial run of the intelligent control system of sheet cut tobacco drier in the Embodiment 1.

Statistics was performed on the alarm accuracy of the energy conservation model, and the results are shown in Table 3.

TABLE 3

|  | instantaneous output weight | theoretical output weight | whether early warning |  | instantaneous output weight | theoretical output weight | whether early warning |
|---|---|---|---|---|---|---|---|
| Batch 1 | 4800 | 4804 | no | Batch 6 | 4800 | 4800 | no |
| Batch 1 | 4789 | 4806 | no | Batch 7 | 4800 | 4807 | no |
| Batch 3 | 4800 | 4800 | no | Batch 8 | 4800 | 4803 | no |
| Batch 4 | 4801 | 4830 | no | Batch 9 | 4802 | 4789 | no |
| Batch 5 | 4807 | 4806 | no | Batch 10 | 4801 | 4807 | no |

It can be seen from the above table that the early warning function of material conservation model is effective and accurate.

Finally, it should be noted that the above are only the preferred embodiments of the present disclosure and are not intended to limit the present disclosure. Although the present disclosure has been described in detail with reference to the foregoing embodiments, for those skilled in the art, they can still modify the technical solutions recorded in the foregoing embodiments, or equivalently replace some of the technical features. Any modification, equivalent replacement, improvement, etc., made within the spirit and principle of the present disclosure should be included in the protection scope of the present disclosure.

The invention claimed is:

1. An intelligent control system of thin plate drier for cut tobacco, comprising
a factor searching and screening unit, configured to search and screen influence factors of the thin plate drier including process parameters, production parameters and environment parameters;
a control unit, configured to adopt a dual-model control method and comprise a process parameter control model and an energy balance model, the process parameter control model adopts a neural network algorithm and is established by using the production parameters and the process parameters as modeling factors, wherein a moisture discharge opening of the thin plate drier as an output value, and other factors as input factors; the energy balance model adopts a principle of heat conservation and is established by calculating a heat input and a heat output in a production process and constructing a heat identical equation;
the control unit calculates a moisture discharge opening value in real time according to the dual-model, and controls the production parameters of the system based on an average value of an actual measurement value and a theoretical value calculated by the dual-model for the moisture discharge opening if a deviation of the actual measurement value and the theoretical value calculated by the dual-model for the moisture discharge opening is less than or equal to 2%; and generates an early warning signal if the deviation of the actual measurement value and the theoretical value is more than 2%;
an early warning unit, configured to connected with the control unit and send out an alarm information based on the early warning signal.

2. The intelligent control system of thin plate drier for cut tobacco according to claim 1, wherein, the control unit also comprises a material conservation model, the material conservation model is established by constructing an identical equation of material input and output, the identical equation of material input and output is as follows:

material input+a process material input=material output+a process material loss;

wherein, the process material input includes HT steam; the process material loss includes moisture dissipation under humidity difference and moisture dissipation under high temperature baking.

3. The intelligent control system of thin plate drier for cut tobacco according to claim 2, wherein,
the control unit monitors materials according to the material conservation model:
when a deviation of an actual output value and a theoretical calculated value is more than 5%, an early warning signal is generated.

4. The intelligent control system of thin plate drier for cut tobacco according to claim 3, wherein, the early warning signal is associated with a production controller, and production can be directly stopped through the production controller to wait for maintenance.

5. The intelligent control system of thin plate drier for cut tobacco according to claim 1, wherein, the intelligent control system also includes a debugging unit, the debugging unit is connected to a current production and operation system WinCC for system debugging.

6. The intelligent control system of thin plate drier for cut tobacco according to claim 1, wherein, the production parameters include outlet moisture of the thin plate drier, inlet moisture of the thin plate drier and drum temperature of the thin plate drier; the process parameters include steam membrane valve opening of the thin plate drier, hot air temperature of the thin plate drier, moisture discharge opening of the thin plate drier, underground fan frequency of the thin plate drier, HT steam and plate platform temperature.

7. The intelligent control system of thin plate drier for cut tobacco according to claim 1, wherein, the environment parameters include ambient humidity.

8. The intelligent control system of thin plate drier for cut tobacco according to claim 1, wherein, the energy balance model adopts the principle of heat conservation, and is established by calculating the heat input and the heat output in the production process and constructing the heat identical equation, the heat identical equation is as follows:

material temperature at feeding end+a process heat input=material temperature at discharging end+a process heat output;

wherein, the process heat input includes heat input of the HT steam and heat input of the plate platform; the process heat output includes environmental heat loss.

9. An intelligent control method of thin plate drier for cut tobacco, wherein, the method is applied to the intelligent control system according to claim 1, and comprises the following steps:
step 1, searching factors;
step 2, screening factors;
step 3, establishing a process parameter control model:
the process parameter control model is established by adopting a neural network algorithm, and taking production parameters and process parameters as modeling factors, wherein moisture discharge opening of thin plate drier as an output value, and other factors as input factors;
step 4, establishing an energy balance model:
the energy balance model is established by adopting the principle of heat conservation, and calculating heat input and heat output in production process and constructing a heat identical equation;
step 5, calculating a moisture discharge opening value in real time according to the models in step 3 and step 4; when a deviation of an actual measurement value and a theoretical value calculated by the models for the moisture discharge opening is less than or equal to 2%, an average value of the actual measurement value and the theoretical value calculated by the dual-model for the moisture discharge opening is used to control the production parameters of the system; when the deviation of the actual measurement value and the theoretical value calculated by the models for the moisture discharge opening is more than 2%, an early warning signal is generated, and an alarm information is sent out by an early warning unit;
step 6, establishing a material conservation model:
the material conservation model is established by constructing an identical equation of material input and output;
step 7, according to the model of step 6, generating an early warning signal when a deviation of an actual output value and a theoretical calculated value is more than 5%, and sending out an alarm information by the early warning unit, stopping the production, and waiting for maintenance.

* * * * *